(12) United States Patent
Plaisted et al.

(10) Patent No.: US 10,590,547 B2
(45) Date of Patent: Mar. 17, 2020

(54) COMBUSTIBLE FUEL AND APPARATUS AND PROCESS FOR CREATING THE SAME

(71) Applicants: Advanced Combustion Technologies, Inc., Las Vegas, NV (US); Sean Casey

(72) Inventors: Robert Plaisted, Irvine, CA (US); Gary J. Bethurem, Las Vegas, NV (US)

(73) Assignee: Advanced Combustion Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/120,427

(22) Filed: Sep. 3, 2018

(65) Prior Publication Data

US 2019/0062930 A1 Feb. 28, 2019

Related U.S. Application Data

(62) Division of application No. 14/119,871, filed as application No. PCT/US2012/039211 on May 23, 2012, now Pat. No. 10,066,304.

(60) Provisional application No. 61/489,059, filed on May 23, 2011, provisional application No. 61/566,554, filed on Dec. 2, 2011.

(51) Int. Cl.
| | |
|---|---|
| C25B 3/00 | (2006.01) |
| C25B 9/06 | (2006.01) |
| C25B 1/08 | (2006.01) |
| C25B 9/20 | (2006.01) |
| F02M 25/12 | (2006.01) |
| C25B 1/06 | (2006.01) |

(52) U.S. Cl.
CPC .......... *C25B 3/00* (2013.01); *C25B 1/06* (2013.01); *C25B 1/08* (2013.01); *C25B 9/063* (2013.01); *C25B 9/203* (2013.01); *F02M 25/12* (2013.01); *Y02E 60/366* (2013.01); *Y02T 10/121* (2013.01)

(58) Field of Classification Search
CPC ............ C25B 9/063; C25B 9/203; C25B 3/00
See application file for complete search history.

(56) References Cited

U.S. PATENT DOCUMENTS

| | | | |
|---|---|---|---|
| 3,262,872 A | 7/1966 | Rhodes et al. | |
| 3,310,483 A | 3/1967 | Rhodes et al. | |
| 3,636,423 A * | 1/1972 | Jenkins | H02M 5/271 318/809 |
| 4,014,777 A | 3/1977 | Brown | |
| 4,081,656 A | 3/1978 | Brown | |

(Continued)

*Primary Examiner* — Nicholas A Smith
(74) *Attorney, Agent, or Firm* — Buchalter, APC; Sean Casey

(57) ABSTRACT

Features for an aqueous reactor include a field generator. The field generator includes a series of parallel conductive plates including a series of intermediate neutral plates. The intermediate neutral plates are arranged in interleaved sets between an anode and a cathode. Other features of the aqueous reactor may include a sealed reaction vessel, fluid circulation manifold, electrical power modulator, vacuum port, and barrier membrane. Methods of using the field generator include immersion in an electrolyte solution and application of an external voltage and vacuum to generate hydrogen and oxygen gases. The reactor and related components can be arranged to produce gaseous fuel or liquid fuel. In one use, a mixture of a carbon based material and a liquid hydrocarbon is added. The preferred carbon based material is powdered coal.

6 Claims, 7 Drawing Sheets

(56) References Cited

U.S. PATENT DOCUMENTS

| | | | |
|---|---|---|---|
| 4,643,809 | A | 2/1987 | Botts et al. |
| 5,231,954 | A | 8/1993 | Stowe |
| 5,482,517 | A | 1/1996 | Ikeda |
| 5,843,292 | A | 12/1998 | Spiros |
| 7,143,722 | B2 | 12/2006 | Ross |
| 7,793,621 | B2 | 9/2010 | Stehl et al. |
| 7,799,452 | B2 | 9/2010 | Yanagita et al. |
| 10,066,304 | B2 | 9/2018 | Bethurem et al. |
| 2007/0089997 | A1* | 4/2007 | Depalo .................... C25B 1/06 205/335 |
| 2009/0286889 | A1 | 11/2009 | Fiato |

* cited by examiner

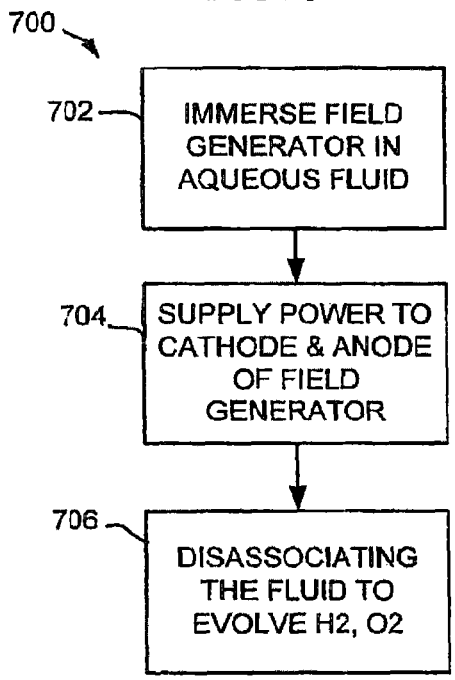
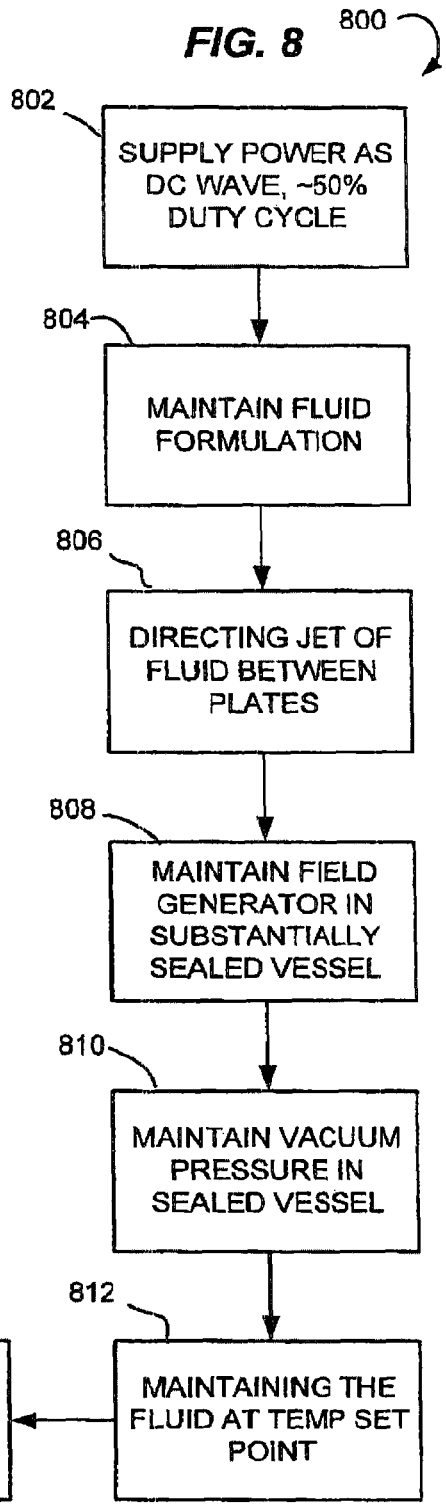

COMBUSTIBLE FUEL AND APPARATUS AND PROCESS FOR CREATING THE SAME

CROSS REFERENCE TO RELATED PATENT APPLICATIONS

This application is a continuation application of U.S. non-provisional application Ser. No. 14/119,871 filed Nov. 23, 2013 and granted as U.S. Pat. No. 10,066,304, which is a national application of Patent Cooperation Treaty application PCT/US2012/039211 filed May 23, 2012, and claims priority thereto and to U.S. Provisional Application Ser. No. 61/489,059 filed May 23, 2011 and 61/566,554 filed Dec. 2, 2011, all of which are incorporated by reference herein in their entirety.

TECHNOLOGICAL FIELD

The present technology relates to the field of combustible fuels and the processes and apparatus needed to create efficient and cleaner combustible fuels.

BACKGROUND

Electrolysis of water to generate hydrogen and oxygen under an applied electric field using various forms of apparatus is well known. Also known are HHO generators which use electrolysis to transform water into its component parts but not to separate the hydrogen and oxygen once released. So too is the reformation of hydrocarbons into hydrogen gas or hydrogen-enhanced gas. But more practical processes for the creation of such fuels are needed.

SUMMARY

The present technology is directed to aspects and use of an aqueous reactor using an applied electric field to initiate or sustain a reaction by which a clean burning fuel is created.

In a first separate aspect of the present technology, an electric field generator is provided for use in the aqueous reactor. The electric field generator comprises a series of electrically conductive parallel spaced-apart plates in an array. One or more first plates of the array, located at a first end of the array, is connected to a source of applied electrical power of a first polarity (e.g., positive or negative). One or more second plates of the array, located at an end of the array opposite to the first end, is connected to a source of applied electrical power of a second polarity, opposite to the first polarity. A set of third plates of the array are preferably interposed between the one or more first plates (herein called the "cathode plates") and the one or more second plates (herein called the "anode plates"). The third plates are preferably unconnected to any source of applied electrical power, to serve as neutral electrodes. The third plates may be arranged in subsets each comprising at least three plates of the array. All of the plates within each of the subsets may be electrically interconnected with each other.

The foregoing technology may further include the subsets being unconnected to other ones of the subsets except through the field in the aqueous reactor, the cathode plates, and the anode plates. The subsets are preferably arranged so that each subset includes at least one plate that is interposed between two plates of an adjacent subset, of the cathode plates, or of the anode plates, and also includes at least two plates disposed around (i.e., having interposed there between) one plate of another adjacent subset, of the cathode plates, or of the anode plates. Such an arrangement of plate subsets is referred to herein as "interleaving" or "interleaved." A subset consisting of three plates may be referred to herein as a "triplet."

The foregoing technology may further include the anode and cathode plates coupled to opposite poles of an electrical power modulator. The electric power modulator may supply a step modulated or ladder switched direct current waveform to the field generator at less than 100% duty cycle. For example, the power modulator may supply a step modulated direct current waveform at a 50% duty cycle. The waveform may be characterized by having a relatively low peak voltage, for example about a peak voltage in the range of 14-24 Volts, and alternating between zero and the peak voltage. However, the technology is not limited to a peak voltage in this range.

The foregoing technology may include an aqueous working fluid to produce hydrogen and oxygen gases such as HHO applied to a field generator, reaction vessel and/or other aspects as described above. The field generator is preferably immersed in the working fluid and electric power applied to opposite poles of the field generator as described above. The aqueous working fluid is preferably comprised of a solution of pure distilled water and a hydroxide salt, for example, potassium hydroxide (KOH). The hydroxide salt functions as an electrolyte and is not consumed. The distilled water is electrolyzed to hydrogen and oxygen at temps preferably between about 115.degree. F. and 130.degree. F. Make up water may be added as the water is consumed to maintain a constant water level. Non-distilled water can preferably be used but may cause increased corrosion or fouling of the apparatus.

The foregoing technology may further include a non-electrically conductive and substantially gas-impermeable barrier membrane, for example a polymer film or sheet material, extending above the level of the liquid between the anode and the cathode. The membrane forms a barrier to prevent the comingling of produced gases from the anode and the cathode.

A mixture of hydrogen and oxygen gas may be drawn out of the reaction vessel using a vacuum pump. The output of the reactor can be varied by the pressure and temperature maintained within the vessel during operation. Thus, it is advantageous to maintain a vacuum in the reaction vessel in the range of about 0.2 to 0.9 atmospheres, and more preferably about 0.2-0.5 atmospheres while the temperature of the working fluid is maintained within a defined range of preferably between 115.degree. F. to 130.degree. F., using fluid recirculation. The vacuum and temperature are balanced to keep the water from boiling or reaching a point where substantial water is vaporized in the process.

The foregoing technology can alternatively be employed to include an aqueous working fluid applied to the field generator, reaction vessel and/or other aspects as described above to produce a liquid hydrocarbon fuel from a solution containing carbon based material. The carbon based material, such as preferably a carbon or coal powder, is dispersed in suspension in an aqueous working fluid as described herein above. The aqueous working fluid preferably includes an initial charge of a hydrocarbon fuel, such as kerosene, diesel, or other such fuels down to and including a molecular weight of gasoline with the carbon based material maintained in suspension.

As discussed above, the output of the reactor can be varied by the pressure and temperature maintained within the vessel during operation. The temperature of the working fluid is maintained within a defined range of between 180.degree. F. to 200.degree. F., using fluid recirculation without pressure, again to avoid boiling or the substantial production of water vapor. Under pressure, the upper end of the temperature can be raised accordingly.

In forming hydrocarbon fuel from carbon based material, conditions may be adjusted empirically to insure reduction of the in-process hydrocarbon fuel to have reduced average molecular weight. For example, most hydrocarbons may be reformed to a hydrocarbon having eight or fewer carbon atoms. The described aspects are preferably used according to processes as described in the co-pending U.S. patent application by the applicants hereof, Ser. No. 12/885,617, the entirety of which is incorporated herein by reference.

In a further separate aspect of the present technology, the anode and cathode plates include a pattern of holes which extend across substantially the full plate to provide an open area which is greater than the occupied area of the plate. The nominal size of the anode and cathode plates is similar to the size of the neutral plates. All plates are preferably made from highly conductive metal, such as copper-tungsten to reduce heat and insure good conductivity. The plates are also plated with a catalyst such as nickel interactive in the electrolysis process. Palladium, platinum or other catalysts may also be useful in facilitating a desired reaction at lower temperatures in the electrolysis.

The foregoing technology may further include any of the foregoing aspects can be combined to greater result.

Accordingly, objects of the present technology may include providing novel features and combinations to enhance operation of an aqueous reactor using an applied electric field to initiate or sustain a chemical reaction or the creation of a plasma in the reactor, for example generation of hydrogen and oxygen gas from water, or hydroxylation/hydrogenation of carbon or organic compounds, the fuel output from such technology and methods for using such features and combinations. Other and further objects and advantages will appear hereinafter.

BRIEF DESCRIPTION OF THE DRAWINGS

FIG. 7 is a flow chart showing an example of a method for operating an aqueous reactor to generate hydrogen and oxygen from an aqueous working fluid.

FIG. 8 is a flow chart showing addition operations that may be used with the method shown in FIG. 7.

DETAILED DESCRIPTION OF THE PREFERRED EMBODIMENT

Figure 1:
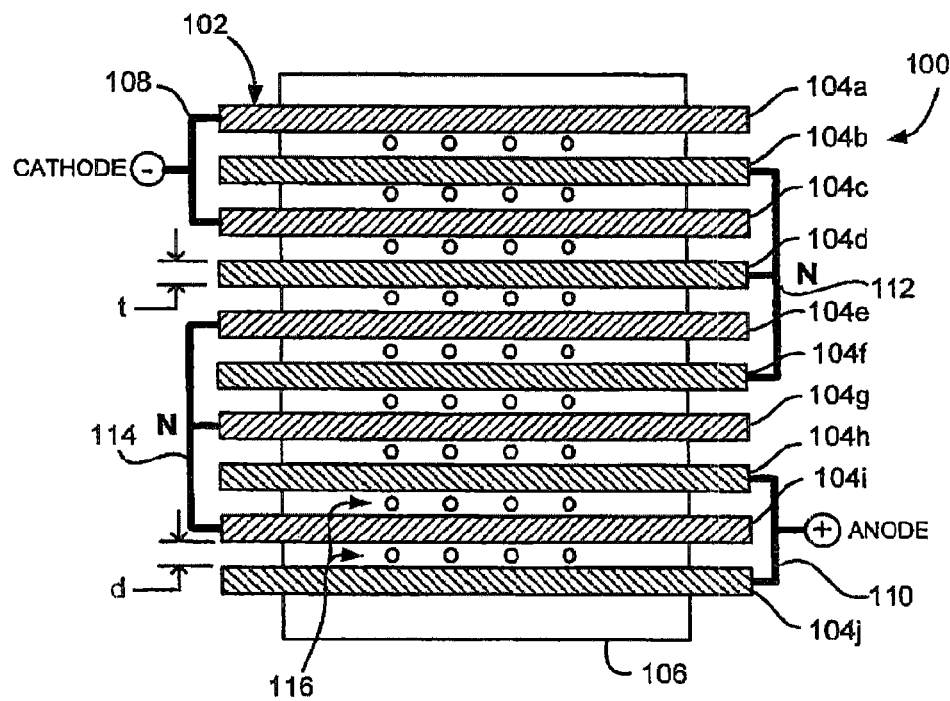
FIG. 1 is a schematic diagram illustrating one embodiment of the present technology relating to a field generator.

With reference to FIG. 1, a field generator 100 for use in an aqueous reactor preferably comprises an array 102 of electrically conductive parallel spaced-apart plates 104a-104j supported by a non-electrically conductive framework or member 106. The array of plates 102 may comprise one or more cathode plates 104a, 104c (collectively, 108) at a first end of the array, one or more anode plates 104h, 104j (collectively, 110) at a second end of the array 102 opposite to the first end. The array of plates may further comprise a plurality of neutral plates 104b, 104d-g, 104i interposed between the cathode plates 108 and the anode plates 110. The neutral plates 104b, 104d-g, 104i may be arranged in interleaved neutral subsets 112, 114 each comprising at least three electrically connected plates. As mentioned above, interleaving of the neutral subsets means that each subset 112, 114 includes at least one plate (e.g., 104b, 104f, 104i) that is interposed between two plates of an adjacent subset, of the cathode plates, or of the anode plates, and also includes at least two plates (e.g., 104d and 104f of subset 112, or 104e and 104g of subset 114) disposed around one plate of another adjacent subset, of the cathode plates, or of the anode plates. Each of the neutral subsets 112, 114 may be electrically isolated from other ones of the neutral subsets, from the cathode plates, and from the anode plates. For example, each of the neutral subsets 112, 114 may be electrically isolated from every other one of the neutral subsets.

In a low power mode, the cathode plates 108 may be configured for connecting to a negative polarity source of applied electrical power, for generating hydrogen. The anode plates 110 may be configured for connecting to a positive polarity source of applied electrical power for generating oxygen. The neutral subsets are not connected to any source of electrical power.

The plates 104a-j are preferably copper-tungsten or other highly conductive material. For the creation of hydrocarbon based fuels, the highly conductive material includes a catalytic surface such as is provided by nickel-plating. The nickel-plated surface treatment of the conductive plates has been observed to have a catalytic effect on the operation of the aqueous reactor.

The plates 104a-j are preferably substantially planar and of substantially uniform thickness "t". It is believed desirable to make the plates thick enough to be durable and rigid during operation of the reactor, and optimal thickness may therefore depend on the selected plate material and plate mounting details. If copper-tungsten is used, the plates are advantageously 0.125" to avoid accidental bending of the soft material. The plates in the array will preferably be spaced substantially uniformly apart a distance "d" in a range of about 0.125 inches from one another. Further aspects of the field generator "plate" are described in connection with FIGS. 3 and 10 below.

The non-electrically conductive framework or member 106 comprises edge supports spaced around a periphery of the plates. Edge supports are believed advantageous to ensure that each plate remains in place during operation. A support member preferably includes other features, for example nozzles 116 for a recirculation manifold as discussed herein. In an embodiment, plate edges were supported by slots formed in blocks of a polymer material, to support the array around a periphery of the plate edges. However, any suitable support structure may be used.

Although the field generator is not limited to a particular number of the plates 104*a-j*, in one embodiment the apparatus preferably comprises not less than nine and not more than 48 neutral plates. An array having properties as described herein is believed to be effective, and perhaps optimally effective, using twenty-five total plates comprised of two cathode plates 202, two anode plates 204, and 21 neutral plates divided into seven triplets 206*a-g*. Such an array 200 is illustrated in a highly schematic form in FIG. 2, which is not to scale and is drawn mainly to illustrate an example of an interleaved plate topology for a field generator 200. The illustrated manner of connecting plates in a triplet, anode or cathode is highly schematic, and should not be understood as illustrating or suggesting an actual physical configuration, apart from the illustrated and described topological aspects.

Each of the neutral subsets 206*a-g* is preferably comprised an odd number of plates, for example, three or five. Three plates per neutral subset (i.e., a triplet) is believed advantageous, although any odd number of three or greater enables interleaving of the neutral subsets, as clearly depicted in FIGS. 1 and 2. Interleaving is believed to be advantageous to operation of the field generator for electrolysis of water and other reactions, at least for use with the applied electrical power waveforms as described herein. In the interleaved embodiment shown in FIG. 2, the cathode plates 202 are interleaved with a first neutral triplet 206*a*, and the anode plates 204 are interleaved with a last neutral triplet 206*g*. The first and last triplets 206*a*, 206*g* are interleaved with their adjoining triplets 206*b*, 206*f*, respectively. The intermediate triplets 206*b-f* are each interleaved with an adjoining triplet. FIG. 1 shows a similar arrangement.

The array 200 may comprise an odd or even number of neutral subsets such as the triplets 206*a-g*. An odd number of neutral subsets is believed advantageous, at least for use with the applied electrical power waveforms as described herein.

Figure 3:
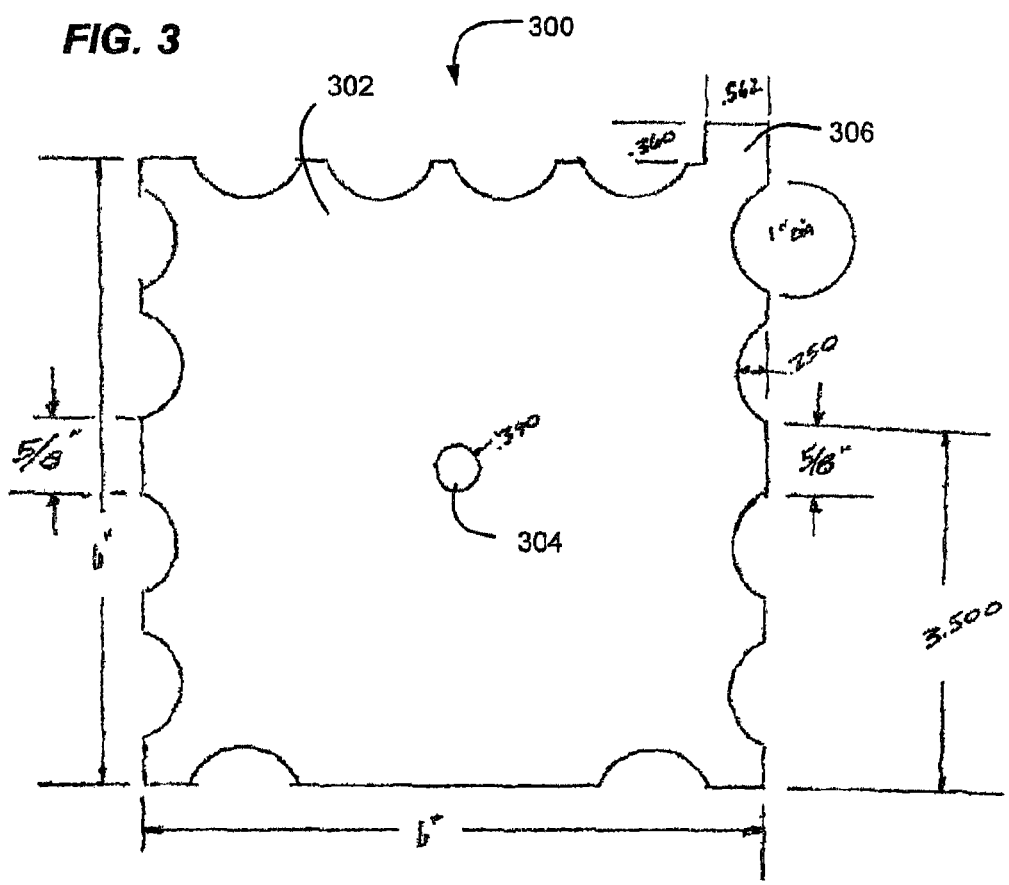
FIG. 3 is a plan view showing an example of a plate for use in a field generator.
Figure 10:
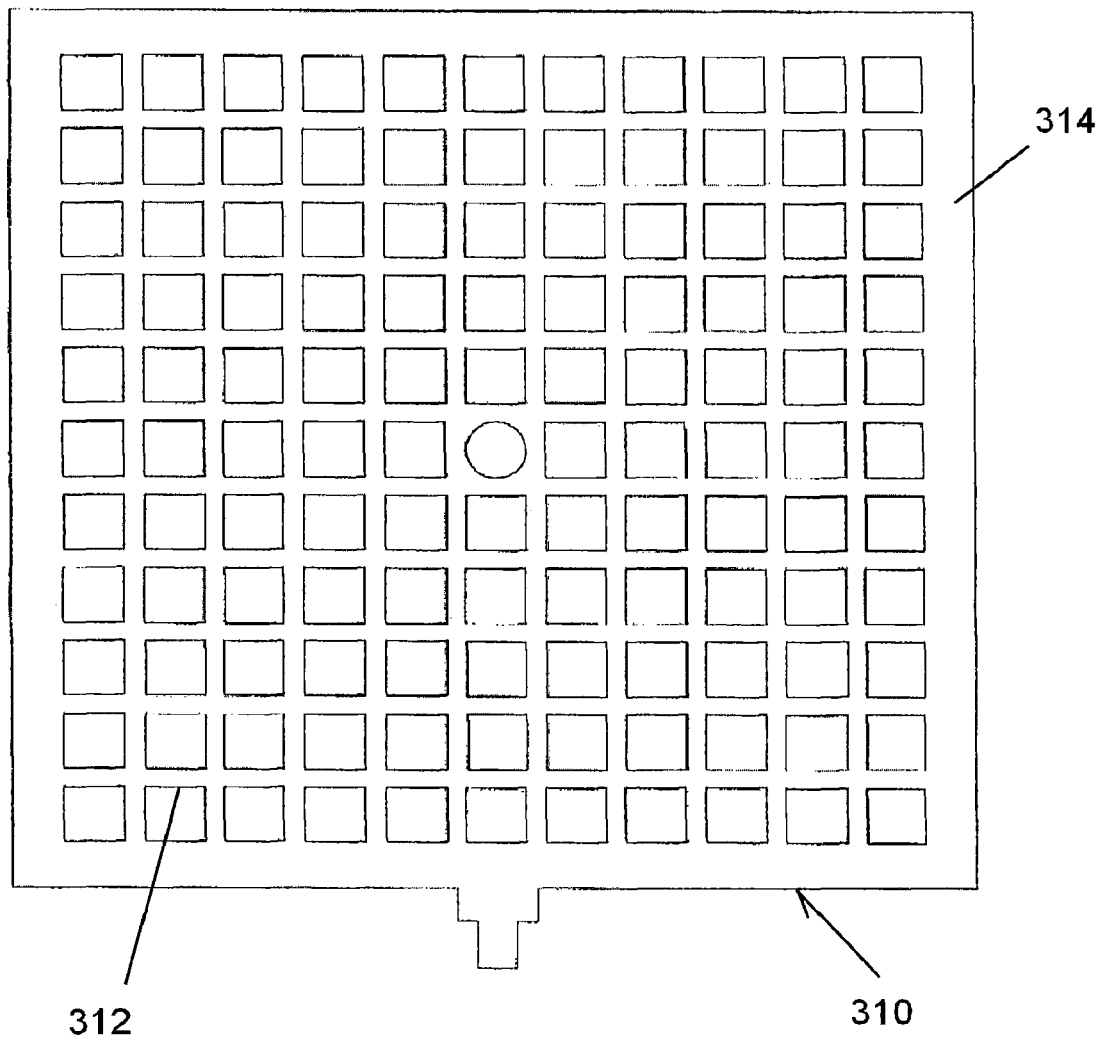
FIG. 10 is a plan view of an embodiment of an anode or cathode plate.

FIG. 3 shows a plan view and dimensions for an example of a plate 300 used to construct a field generator as described herein. The plate 300 as shown is employed for the neutral plates 104*b*, 104*d-g*, 104*i* of FIG. 1. FIG. 10. Highly conductive materials may be suitable, for example, copper, nickel-plated copper, nickel, platinum or palladium plated metals, or graphite. Other metals have also been used. Any structural conductive material may be used that is either coated or will not be appreciably corroded by the working fluid of the aqueous reactor during use. Any surface material selected may have an effect on the operation of the field generator. There appears to be a catalytic effect observed when nickel plating covers the plates 104*a-j* in the electrolytic process. Additionally, the presence of nickel, palladium, platinum or other catalysts may be helpful in facilitating a desired reaction at lower temperatures. Various surface treatments can enhance operation of the field generator, although robust hydrolysis of water in a potassium hydroxide solution was even observed using untreated 316 L stainless steel.

The plate 300 may be characterized by opposing generally parallel primary surfaces. One of these surfaces 302 is shown in the plan view of FIG. 3. The opposite surface of plate 300 comprises the second surface. This characteristic enables construction of a field generator as described in connection with FIGS. 1 and 2. These primary surfaces are not necessarily flat and planar, and may be contoured so long as maintaining a generally parallel orientation with respect to the adjacent surface of its closest neighboring plate.

The dimensions and shape shown in FIG. 3 are provided by way of example only, and not by limitation. The depicted dimensions and shape are believed useful for, but not critical to, construction of a field generator. The plate 300 includes a central hole 304 to accommodate a non-conductive support member used to support plates in the field generator. The plate 300 could preferably include any number of holes or cutouts and may be made in a variety of shapes. The plate 300 may include a tab 306 for use as an electrical connector to an adjacent plate, to an external power source, or both. As used herein, "plate" is not limited to generally planar components, or to components made of plate stock. Instead, a "plate" should be understood to be preferably generally flat, contoured or folded, with any number of through holes and formed of any suitable material. For example, a grid or wire mesh material, so long as sufficiently rigid to hold its shape in operation, may be configured as a "plate" in the field generator as described herein.

Substantially all stated above in reference to plate 300 applies to the anode plates 104*h*, 104*j* and cathode plates 104*a*, 104*c*. In certain of the processes described, the anode plates 104*h*, 104*j* and cathode plates 104*a*, 104*c* have found further efficiency using holes in these plates. This is particularly true for the hydrocarbon and carbon conversion process. Such anode and cathode plates are schematically illustrated in FIG. 10. The representative plate 310 includes a pattern of holes 312. This is but one of an almost infinite pattern of holes that might be applied. The object is to significantly cover the plate 310 with the holes 312. The employment of this type of plate for the anodes and cathodes has been found to cut power requirements and increase production of gas. In this specific embodiment, a plate of copper-tungsten plated with nickel and having a nominal height/width/depth of 6".times.6".times.⅛" is perforated uniformly before plating with holes ⁵⁄₁₆" square. The holes 312 are spaced apart ⅛", giving a hole center-to-center distance between adjacent holes of ⁷⁄₁₆". A slightly wider structural border 314 extends about the periphery of the plate 310.

Figure 4A:
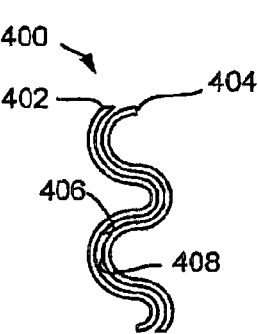
FIGS. 4A-4B are schematic diagrams illustrating alternative configurations for plates in a field generator.
Figure 4B:
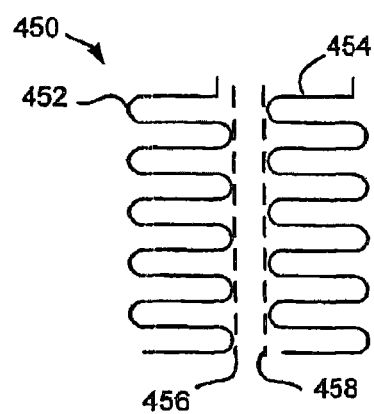

Although plates 300, 310 may be generally flat or planar, the field generator is not limited to use of planar plate elements. For example, contouring or folding may be used to increase surface area of a plate, while maintaining a generally parallel relationship with an adjacent plate. FIG. 4A shows a top view of two adjacent contoured plates 402, 404 in a configuration 400 wherein each of the plates 402, 404 includes respective contoured surfaces 406, 408 maintaining collinear (or near collinear) normals for substantially their entire respective extents. A drawback of this configuration is that in an array made up of plates of equal area, exact parallelism cannot be maintained between adjacent plates without individually contouring each plate. This can be avoided by using an alternative configuration 450, shown in FIG. 4B, in which folded adjacent plates 452, 456 present multiple folds defining respective virtual surfaces 456, 458, which are substantially parallel. Adjacent plates 452, 456 may therefore share substantially the same or identical contoured geometries while still providing an aspect of parallelism between adjacent plates. The alternative configurations 400, 450 are currently untested and may not, on balance, be advantageous over flat plates. Advantages of flat plates include simplicity of fabrication, lower cost, easily achieved parallelism and less resistance to fluid flow between adjacent plates.

Figure 5:
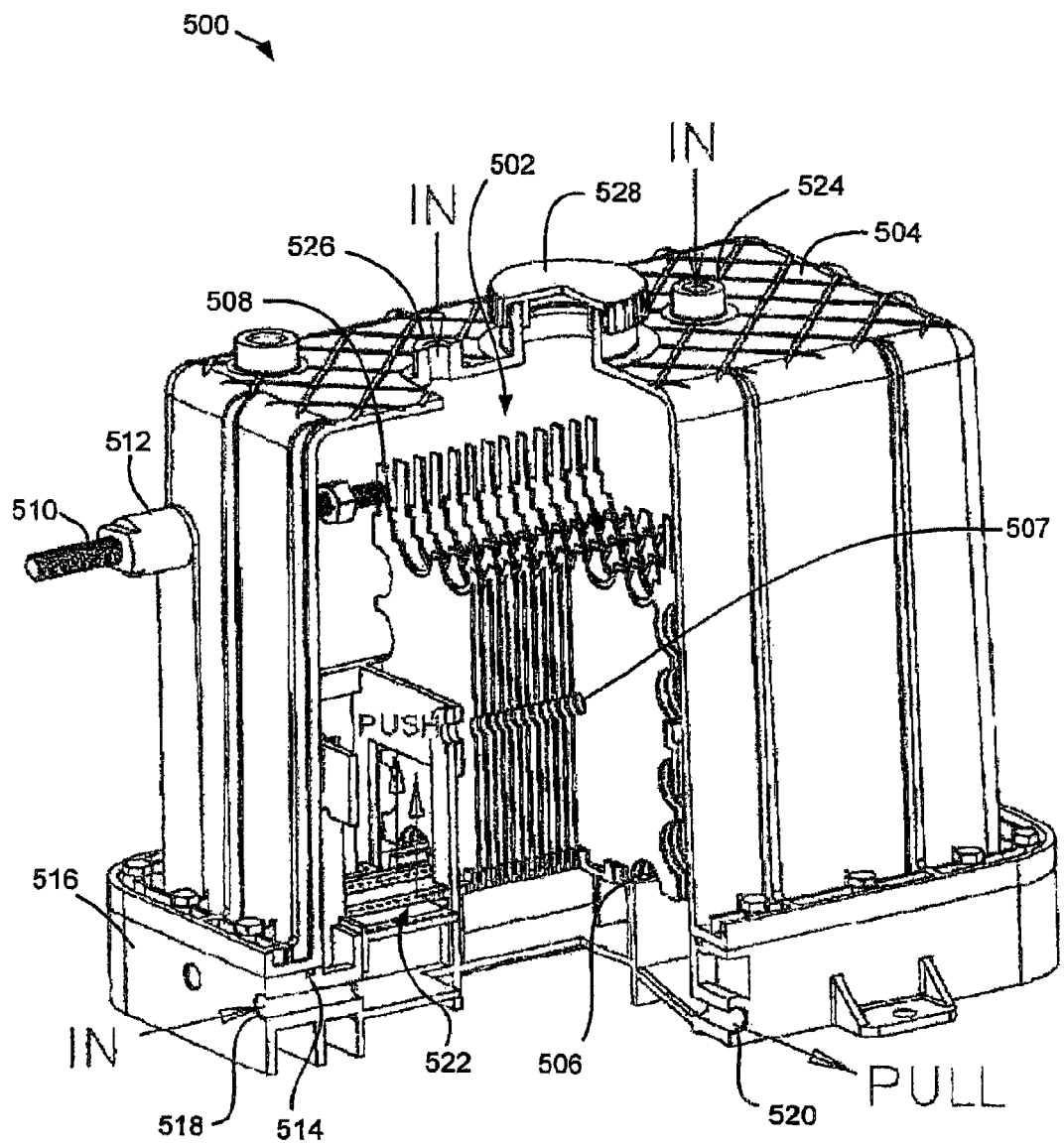
FIG. 5 is a perspective cut away view of an aqueous reactor incorporating a field generator.

FIG. 5 shows an example of a field generator 502 assembled into an aqueous reactor 500. The reactor 500 includes a substantially closed vessel or container 504, constructed for holding a liquid working fluid so as to immerse the field generator 502. The field generator 502 may comprise an array of plates, for example, the neutral plate 300 as shown in FIG. 3 and the anode/cathode plate 310 shown in FIG. 10, supported by a non-electrically conductive framework 506. A cylindrical non-conductive support member (not shown) may pass through a central hole 507 in the plates to secure the plates to the supporting framework. The plates may be connected to provide cathode plate sets, anode plate sets, and neutral sets as described herein, using connectors (not shown) placed across selected connecting tabs at the upper end of the generator 502. During operation, the liquid level in the container 504 may be maintained below the level of the plate connecting tabs, for example the tab 508 that is connected to an electrical cable 510 supplying electrical power to the field generator 502. A complementary electrical cable, not visible in this view, may similarly be connected to a plate of opposite polarity located at an opposite end of the array 502.

The cable 510 or its complement may be passed through a wall of the container 504 using a feed-through 512 designed to maintain a seal. Where power straps are employed in the bath to distribute current, they too may be nickel coated and of a highly conductive material to reduce heat build-up and provide more catalytic surface area. The container 504 may be substantially sealed except for control inlet and outlet ports, examples of which are discussed below. In the illustrated unit 500, an O-ring seal 514 is disposed around a base 516; however, any suitable seal may be used.

A liquid inlet 518 and outlet 520 in the base 516 may be provided for connecting to a recirculation system, which may comprise a pump, heat exchanger, and connecting lines. The recirculation system, among other things, may circulate the working fluid through an array of nozzles in the base 516. The nozzles preferably inject the working fluid in between individual plates in the field generator 502. Fluid injection between the plates is believed helpful for enhancing fluid movement, heat transfer and mixing between the plates, and to help strip accumulated gas bubbles from the plate surfaces. Upper ports include one or more liquid addition ports 524 and 526 for addition and make-up of working fluid constituents, and a solids entry/inspection port 528.

Figures 6A, 6B:
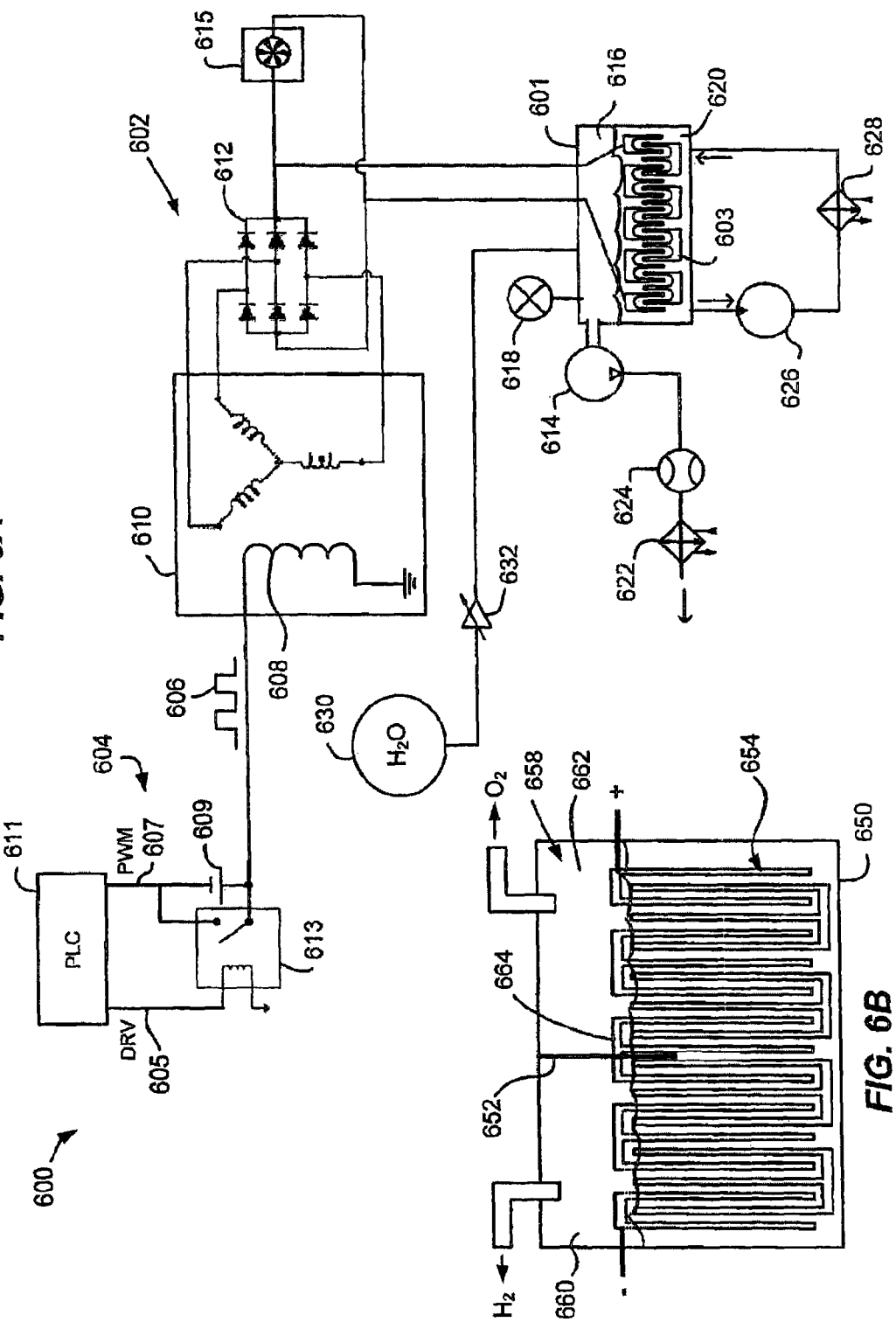
FIG. 6A is a schematic block diagram of an apparatus including an aqueous reactor to generate hydrogen and oxygen from an aqueous working fluid.
FIG. 6B is a detail schematic showing an alternative configuration of the aqueous reactor including an intermediate barrier for gas separation.

An aqueous reactor as described above may be used in an apparatus 600 for reacting an aqueous working fluid in an electric field, further aspects of which are illustrated in FIG. 6A. The apparatus 600 preferably includes a source 602 of applied electrical power connected to the cathode plates and anode plates of an aqueous reactor 601, as previously described. The power source 602 preferably comprises a pulse width modulator 604, also called a waveform generator, which preferably includes a programmable logic controller (PLC) or electronic control unit (ECU) 611. Preferably, the wave form generator 604 can supply a Direct Current (DC) drive signal 606 to a field winding 608 of a three-phase alternator 610. The DC drive signal preferably has a duty cycle in a range of about 10% to 90%, a frequency in a range of about 1 to 32 kHz, and a peak voltage in a range of about 5 to 50 V. More preferably, the DC drive signal 606 has a duty cycle of about 50% and a peak voltage of about 14-24 V, depending on the size of the field generator 603. When step switched and pulse switched, the 50% duty cycle provides a drive signal for the field generator at 25% of the current draw at the source 604.

For example, a PLC or other source 611 preferably generates a drive signal 605 at a first frequency and first duty cycle to drive a switching device 613, such as a solid state relay. The source 611 preferably provides a pulse width modulated (PWM) power signal 607 at a second frequency and second duty cycle to an input of the switching device 613. In an embodiment, the first and second duty cycles could preferably be equal and set to 50% or about 50%, and the second frequency may be much higher than the first frequency, for example at least ten times greater. For example, in an embodiment, a first frequency of 1 kHz may be used for the drive signal 605 at duty cycle of 50% at 24 V, and a second frequency of 60 kHz at 12 V, 50% duty cycle, may be used for the PWM power signal 607. The switching device therefore generates the DC drive signal 606 having a frequency and duty cycle equal to the first frequency and duty cycle. A capacitor 609 is preferably connected across the input and output terminals of the switching device 613 to filter out the higher second frequency and reduce current draw from the source 611. The peak voltage and power of the drive signal 606 is determined by the power signal 607, in this example 12 V.

By applying the drive signal 606 to the field winding 608 of the three-phase alternator 610, on/off switch may be accomplished by building and collapsing a magnetic field, instead of junction switching. Thus, the power source 602 supplies robust, reliable power to the aqueous reactor 601, preferably without requiring the use of metal-oxide-semiconductor field-effect transistors (MOSFETs) or other delicate switching devices. Preferably, an AC signal from the three-phase alternator 610 is rectified using a three phase full wave rectifier 612 to provide a DC drive output for the electrodes of the field generator 603. A cooling device 615, for example a fan and cooling tower, is preferably connected across the drive output or to another power source for cooling the alternator 610.

The apparatus 600 preferably further includes a vacuum pump 614 having an inlet in fluid communication to an interior of the containment vessel for the reactor 601, for example drawing from a head space 616 over the field generator 601. A vacuum gauge 618 may be used to measure pressure in the reactor 601. For electrolysis of water, it has been found desirable to maintain a vacuum in the head space 616 having a magnitude below that which would induce boiling or substantial production of vapor for the operating temperature of the water. Some vacuum, one example being run at about 0.5 atmospheres of vacuum, operates to initiate or maintain a more robust electrolysis reaction, and create gas at lower temperatures. The vacuum pump 614 is preferably also be used to draw off evolved gases from the reactor 601. Using an aqueous working fluid 620 comprised of an electrolyte solution of a hydroxide salt in pure water immersing the field generator 603, the evolved gases in a non-separated headspace 616 should comprise about 60% molecular hydrogen, 30% molecular oxygen, and the balance water vapor or other impurities. Preferably, the evolved gases are passed through a heat exchanger 622 or cooler to cool and dry the gas before discharging for storage or end use. A flow rate may be measured using any suitable flow meter 624.

Uses for a hydrogen and oxygen mixture may include mixing with other fuels in a conventional hydrocarbon combustion engine to alter combustion conditions or emissions, or supplying as feedstock to a chemical process to produce a product including but not limited to purified water. If the hydrogen is separated from the oxygen, the separated hydrogen and oxygen may be provided to a proton exchange membrane (PEM) fuel cell to produce electricity, for mobile or stationary applications. In addition, hydrogen may be combusted in a hydrogen combustion engine or gas turbine to produce electricity or motive power. For example, hydrogen may be produced using renewable resources with variable duty cycles such as solar, wind or wave energy, and stored for combustion in a hydrogen engine or gas turbine for demand matching purposes. The present technology is not limited to any particular end use for gases evolved from the reactor 601.

In alternative embodiments of an aqueous reactor 650 as shown in FIG. 6B, one or more non-conductive barrier membranes 652 or diaphragms may be disposed between at least two plates of the field generator 654 between the anode plates and cathode plates, dividing the headspace 658 into two or more compartments 660, 662. The barrier should extend below the fluid level and into the plate array of the field generator 654, but not extend entirely through to the bottom of the array below the fluid level. The barrier may be placed roughly in the middle of the array or at other intermediate positions; for example, in a 25-plate array, between the 12.sup.th and 13.sup.th plates, or between the 13.sup.th and 14.sup.th plates. A slot or other cutout may be made in the barrier to enable a jumper or electrical connector 664 connecting plates in a neutral subset of the array to pass through the barrier 652. Each divided part 660, 662 of the headspace may be evacuated in a separate stream. At low power, hydrogen should be concentrated in a compartment 660 containing the cathode, and oxygen should be concentrated in a compartment 662 containing the anode.

In these alternative embodiments, it is advantageous to reduce the peak voltage of the drive signal relative to embodiments wherein separation of hydrogen and oxygen is not performed. For example, for the example reactor 650 configured as described herein with a single barrier 652, it may be useful to reduce the voltage of the drive signal to somewhere in the range of about 6 to 8 V to achieve better separation of hydrogen and oxygen. In such embodiments, gas bubbles are typically observed to form on plates located near the anode or cathode plates, but not on intermediate plates near the barrier 652. If an intermediate compartment containing neither anode nor cathode is provided using two or more barriers (not shown), it should contain a mixture of hydrogen and oxygen, which mixture may be separately evacuated.

Referring again to FIG. 6A, the apparatus 600 preferably further includes a liquid pump 626 having an outlet coupled to a recirculation manifold in the reactor 620. A recirculation manifold has been described in connection with FIGS. 1 and 5 above. The recirculation manifold may be positioned to direct one or more jets of recirculated working fluid between plates in the plate array of the field generator 603. The pump 626 may also drive the recirculated working fluid through a heat exchanger 628 or other device for temperature control of the working fluid. For various reactions, it may be advantageous to control the temperature of the working fluid 620 to a set point, using a controlled heating or cooling process. For example, in an aqueous electrolysis process as described herein, it has been found advantageous to cool or heat the working fluid to maintain a temperature set point, depending on ambient temperature or other factors. Higher concentrations of electrolyte may be advantageously employed as a function of sustained lower temperatures.

The apparatus 600 preferably further includes a reservoir 630 of distilled water, and a control valve 632 for supplying make up water to the reaction vessel to maintain a constant volume of working fluid 620 during operation of the aqueous reactor 601. Although distilled water was used to prepare the working fluid, the present technology is not limited to use of distilled water. For example, it may be possible to prepare a useable working fluid from filtered well water, or ocean water. Using ocean water in a working fluid, it may be possible to operate the aqueous reactor in a process for water distillation and purification, by combusting the evolved hydrogen and oxygen to obtain pure water, with the heat of combustion being separately employed.

In accordance with the foregoing, a process 700 for disassociating hydrogen and oxygen from water is depicted in FIG. 7. The process 700 preferably includes immersing 702 a field generator, as described herein, in an aqueous working fluid. The aqueous working fluid may comprise or consist of a solution of a hydroxide salt in pure distilled water or deionized water.

The method 700 preferably further includes supplying 704 electrical power to one or more cathode plates and one or more anode plates at opposite ends of a field generator comprising an array of electrically conductive parallel spaced-apart plates as described herein. The array of plates preferably includes a plurality of neutral plates interposed between the cathode plates and the anode plates of the types described herein. The neutral plates are preferably arranged in interleaved neutral subsets each comprising at least three electrically connected plates. Each of the neutral subsets may be electrically isolated from other ones of the neutral subsets, from the cathode plates, and from the anode plates. For example, each of the neutral subsets may be electrically isolated from every other one of the neutral subsets.

The method 700 preferably further includes disassociating 706 a fluid comprising water disposed around the array of plates to evolve gaseous-phase hydrogen and oxygen, while supplying the electrical power.

In addition, FIG. 8 shows further optional operations 800 that may be implemented for use in an apparatus performing the method 700. The operations 800 may be performed in any operative order; or performed concurrently, partly or entirely, without requiring a particular chronological order of performance. Operations are independently performed and not mutually exclusive. Therefore any one of such operations may be performed regardless of whether another downstream or upstream operation is performed. For example, if the method 700 includes at least one operation of FIG. 8, then the method 700 may terminate after the at least one operation, without necessarily having to include any subsequent downstream operation(s) that may be illustrated.

The operations 800 may include supplying the electrical power by supplying 802 a direct current wave having a duty cycle in a range of 10% to 90%, a frequency in a range of 1 kHz to 32 kHz and a peak voltage in a range of 5 V to 50V. For example, duty cycles of 50% are believed advantageous. Frequency may be tuned to maximize production for a given configuration of aqueous reactor, and are not limited to the stated range. Likewise, the peak voltage may depend on the size and impedance of the reactor under operating conditions.

The operations 800 may include maintaining 804 a formulation of the working fluid comprising a solution of a hydroxide salt in pure distilled water. In an embodiment, 120-220 grams, for example about 120 grams, of KOH salt may be dissolved in 1.5 gallons of distilled water to provide an initial volume of working fluid. The formulation may be maintained by adding water to maintain a constant volume of working fluid in the reaction vessel, during gas evolution. Reducing the concentration of KOH (or other hydroxide salt) in the working fluid substantially below the stated range may reduce current flow through the field generator & reduce the volume of gas evolved.

The operations 800 may include directing 806 at least one jet of fluid between ones of the plates in the array, for example using a recirculation manifold and pump as described above. The operations 800 may include maintaining 808 the array of plates making up the field generator within a substantially sealed reaction vessel. In addition, the operations 800 may include maintaining 810 the array of plates at less than atmospheric pressure within the substantially sealed reaction vessel. For example, maintaining a vacuum pressure may include lowering an interior pressure of the substantially sealed reaction vessel to a pressure in the range of about 0.3 to 0.8 atmospheres. For further example, a vacuum of about 0.5 atmospheres may help initiate and sustain a robust generation of evolved gas from the field generator.

The operations 800 may include maintaining 812 a temperature of the fluid at a set point while disassociating the fluid. In an embodiment, the fluid may be initially at an ambient temperature that is above the freezing point of the working fluid and below the boiling point of the working fluid prior to operation, and maintained at or near a set point of about 120.degree. F. during operation of the aqueous reactor.

The operations 800 may include removing 814 a mixture of the hydrogen and oxygen from the reaction vessel using a pump. In low power embodiments, this may include removing a first stream comprised primarily of the hydrogen from a first portion of the reaction vessel proximal to the cathode plates and distal from the anode plates. In such embodiments, removal may also include removing a second stream comprised primarily of the oxygen from a second portion of the reaction vessel proximal to the anode plates and distal from the cathode plates. This assumes that the first and second portions of the head space above the water in the reaction vessel are separated by a non-conductive barrier membrane disposed between at least two plates of the array. In these and other embodiments, a mixture of hydrogen and oxygen may be withdrawn together from a combined headspace.

When water is used without a carbon based material to create HHO, as hereinabove described, the temperature inside the aqueous reactor is typically observed to be between 115.degree. F. and 130.degree. F. The vacuum inside the aqueous reactor 900 has been observed to vary up to 1.5 atmospheres, with a typical observed magnitude of approximately 0.67 to 0.8 atmospheres of vacuum at the beginning of the process and approximately 0.33 to 0.5 atmospheres of vacuum when the process is operating between 115.degree. to 130.degree. F. At steady state, the power generating the field can be varied to achieve the appropriate temperature set point. In operation, the electrical field inside the aqueous reactor is observed as being supplied with power at between 1 and 25 amps at between 12 and 24 volts. The power draw at the reactor 900 has been observed to be approximately 6 to 6.5 amps at 12 to 14 volts. A similar output production of fuel can be achieved by electrically connecting 4 reactors 900 in series and supplying the reactors 900 with 2.4 amps at 12 volts as is produced using one reactor 900 supplied with 6.5 amps of power at 12 volts. For use in a conventional engine application, it would be possible to create sufficient production of fuel from four reactors 900 so arranged cells by supplying the necessary power from two alternators and two bridge amplifying rectifier towers, each having a well-known conventional design.

Figure 9:
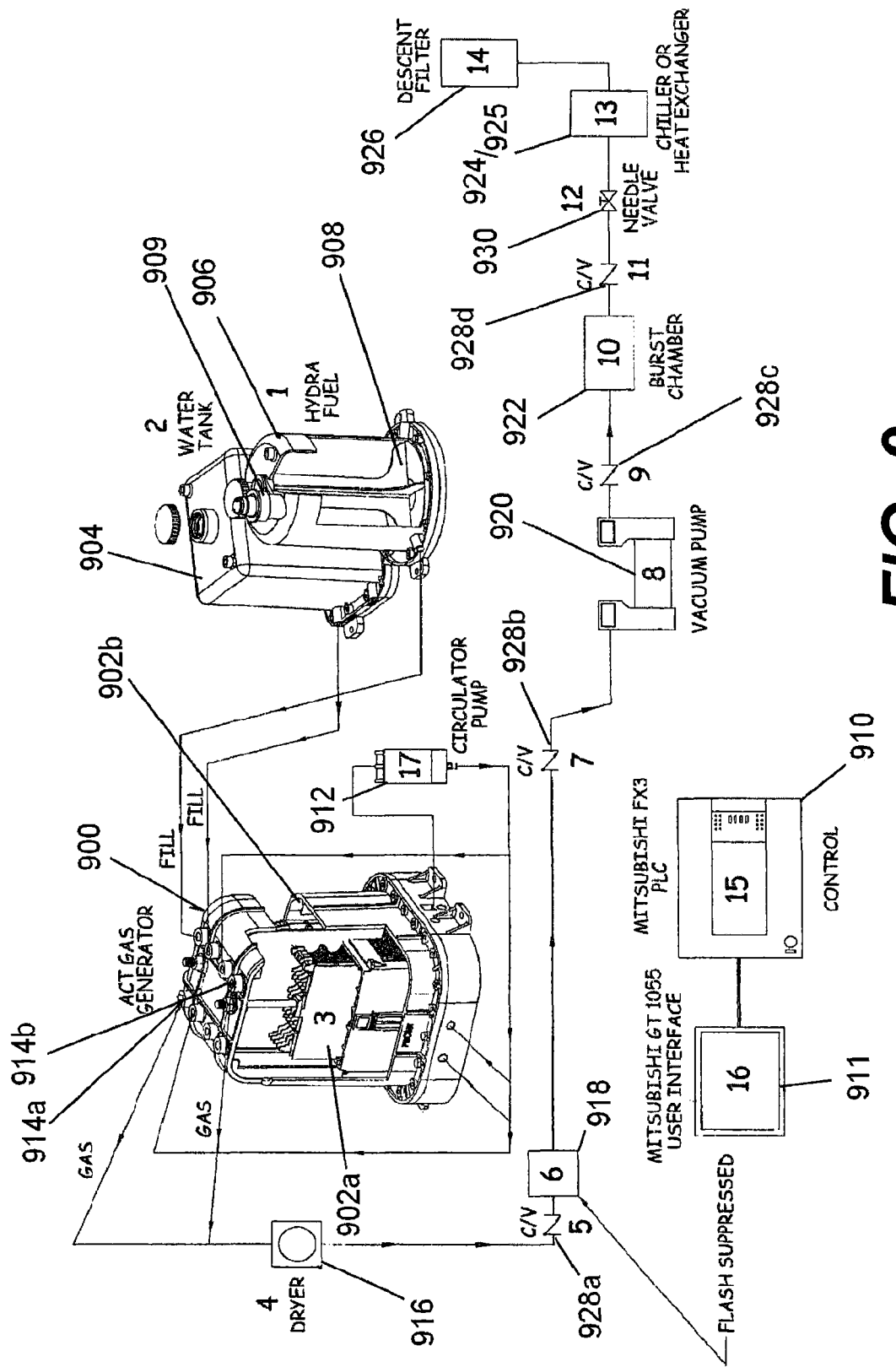
FIG. 9 is a schematic illustrating an embodiment of an alternative configuration of the technology.

An alternative aspect of the technology is illustrated in FIG. 9. In this configuration, the technology utilizes an aqueous reactor 900 of the type hereinabove described, including a series of electrode plate sets 902a and b and an aqueous working fluid. The anode and cathode plates for this process are preferably as described above and illustrated in FIG. 10, the representative plate 30, and can use catalyst plated plates. The working fluid is preferably supplied to the reactor 900 as described above from a fluid tank 904, and preferably uses de-ionized water. Where the aqueous working fluid also includes a hydrocarbon component, that component is preferably supplied from a hydro fuel tank 906. Preferably, the working fluid is a suspension of a carbon based material, such as a coal powder, mixed with one or more liquid hydrocarbons and water as needed. The liquid hydrocarbon, preferably kerosene, diesel, or some other liquid hydrocarbon down to and including gasoline in molecular weight, is provided to help the coal dissolve more readily.

Where the technology utilizes a carbon based material, a hydro fuel mixer 908 is also provided to supply a mixture of liquid and carbon based material to the aqueous reactor working. The hydro fuel tank 906 preferably includes an agitator 908 to maintain the carbon based material in suspension in the fluid in the hydro fuel tank 906. In the preferred embodiment, the carbon based material will be coal ground to a fine powder having a median particle diameter of between 2 microns and 50 microns, and preferably between 5 microns and 10 microns. Enhanced results of the technology has been found to exist where the carbon powder is produced through a turbine spun process or other process which results in the ground carbon particulates having an electrical charge. The hydro fuel tank 906 includes a drive motor 909 which will operate the agitator 908 as necessary to maintain the carbon based material particulate in suspension in the liquid.

Preferably, upon initiation of the process, the aqueous reactor will contain approximately two gallons of water, eight ounces of ground carbon based material such as coal and four to six ounces of liquid hydrocarbon. Kerosene, diesel, or other liquid hydrocarbon down to gasoline in molecular weight have been shown to work in the process. The liquid hydrocarbon is mixed with the carbon material before introduction to the aqueous reactor. In the reactor, this range of mix appears to better reform with the disassociated hydrogen and oxygen present in the applied electric field. Both the liquid hydrocarbon and the carbon based material are consumed in the presence of the disassociated elements of electrolysis. These ratios of ingredients in the aqueous reactor are controlled by supplying additional water from the water tank 904 or additional liquid mixture of the hydrocarbons and suspended carbon based material from the hydro fuel tank 906 at the command of a controller 910. In the preferred embodiment, as described above, the controller is preferably a Mitsubishi FX3PLC which interfaces through a Mitsubishi GT1055 user interface 911. The controller 910 also monitors the status of the hydro tank 906 suspension and operates the drive motor 909 as needed to maintain same.

The aqueous reactor preferably operates under an electrical field through the duty cycles described hereinabove, with fluid movement through the aqueous reactor 900 preferably enhanced, in the manner hereinabove described and as illustrated in FIG. 9, through the use of a circulator pump 912 which is also controlled by controller 910. The fuel product of the aqueous reactor is evacuated from the reactor 900 by a vacuum pump 920 through gas outlets 914a, b.

In the preferred embodiment of the technology, the fuel product removed from the reactor 900 is passed through a dryer 916 to remove any liquid from the gas and through a flash suppressor 918 to minimize the potential danger presented by the volatile fuel output from the reactor 900. The technology also preferably includes other safety equipment such as a burst chamber 922, designed to burst in the event of an explosion, and a series of check-valves 928a, b, c to prevent any ignition source from reaching the aqueous reactor 900.

The fuel output of the reactor 900 can be used in a gaseous or liquefied form. If the fuel is to be used in a gaseous form, the fuel gas is heated by a heat exchanger 924 and then passed through a descent filter 926. It is thereafter supplied to a combustion chamber to serve as a gaseous fuel. Alternatively, if the fuel gas is to be used as a liquefied fuel, the fuel gas is cooled by a chiller 925. It is thereafter supplied to a combustion chamber to serve as a liquid fuel. In either case, a needle valve (or a check valve with an appropriate preselected pressure rating) 930 is interposed between the burst chamber and the chiller 925/heat exchanger 924 in order to control the pressure. The vacuum pump 920 and chiller 925 or heat exchange 924 are also controlled by the main controller 910.

When a carbon based material and hydrocarbon fuel are added to the working fluid in the aqueous reactor 900 using the technology illustrated in FIG. 9 as outlined above, experimental results indicate that the system can operate at 0.5 atmospheres of vacuum. In the operating system, no vacuum or pressure is applied to the aqueous reactor 900. At the initiation of the aqueous reactor process, experimental results suggest that approximately 3.8 amps of power at 12 volts is adequate to initiate the reaction in the reactor cell. Once the temperature of the fluid inside the reactor reaches approximately between 180.degree. F. and 200.degree. F., the power requirement has been observed to reduce to approximately 2.8 amps at 12 volts. It is believed that plasma is formed inside the aqueous reactor that continues to produce gaseous output for a time even after the electrical power input has been shut down until the plasma dissipates. At these levels of production, the technology illustrated in FIG. 9 has been observed to consume approximately 8 ounces of coal per hour.

Variations in the output of the technology illustrated in FIG. 9 can be controlled by controlling the temperature and pressure inside the aqueous reactor, as well as the level and content of potassium hydroxide and/or the quantity of the chosen carbon based material fuel. For example, increasing the potassium hydroxide level in the reactor vessel will draw additional power into the system, but can make the output less productive. The temperature of the working fluid is maintained within a defined range of between 180.degree. F. to 200.degree. F., using fluid recirculation without pressure, to avoid the substantial production of water vapor or boiling. Under pressure, the upper end of the temperature can be raised accordingly and is believed to increase production.

For commercially productive units, it is believed that an aqueous reactor 900 that operates at approximately 2 bars and 300.degree. F. could be constructed to make commercial quantities of fuel using the technology illustrated in FIG. 9.

Other variations in the fuel output characteristics can be controlled by controlling other parameters, for example the pressure. It has been observed that higher pressure enhances the gas production from the technology illustrated in FIG. 9. The gas that is produced at higher pressures will tend to have a higher molecule count of hydrogen. A lighter fuel, however, can be produced by lowering the pressure inside the reactor vessel. The technology illustrated in FIG. 9 is not limited by or to any specific combination of temperature, pressure, electrical field voltage and/or amperage, nor by any concentration of, the size of, or the choice of, any chosen carbon based material.

EXAMPLE

Figure 2:
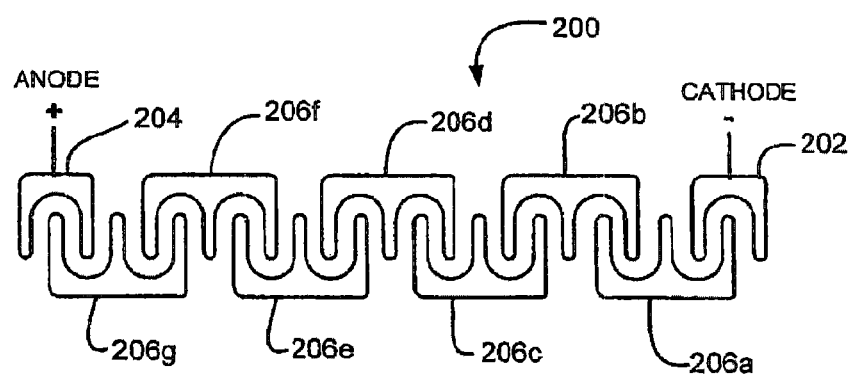
FIG. 2 is a block diagram illustrating an arrangement of neutral subsets, cathode plates and anode plates for an embodiment of a field generator.

Two 25-plate field generators each with stainless steel plates as shown in FIG. 3 were configured according to the topology shown in FIG. 2 in a sealed reaction vessel, and connected in parallel to a power source. A vacuum pump was arranged to draw evolved gases from each vessel. A working fluid comprised of about 1.5 gallon of pure distilled water to 120 grams of potassium hydroxide (KOH) salt was formulated and supplied to each reaction vessel, immersing the field generators. No barrier diaphragm was present. The vacuum pump was used to evacuate a headspace in each aqueous reactor to about 7 inches (mercury) below atmospheric (i.e., 7 inches of vacuum), drawing about 600 watts at 120 V. The temperature of the working fluid was maintained at about 180.degree. F. using a recirculation pump drawing about 400 watts at 220 V, passing the working fluid through a cooler and discharging to recirculation manifold under the field generator, as described. A square wave, 50% duty cycle DC input was supplied to the field generators and resulted in maximum observed gas evolution at about 15 V peak, drawing about 7.3 amperes. Pure distilled make up water was added to the aqueous reactors during gas evolution to maintain the liquid level in the reaction vessel. Very vigorous gas evolution was observed to occur uniformly on all plates in the field generator. Evolved gases were withdrawn from the headspace using the vacuum pump, which maintained a constant vacuum of about 7 inches Hg in the reaction vessel. Discharge from the vacuum pump was passed through a ball-float flow meter and then discharged to the atmosphere. A sample of the discharge was captured in a laboratory gas sample bag, and analyzed using gas chromatography. A sample result of about 60% hydrogen, 30% oxygen was obtained. A total flow rate of about 100 L/min at standard temperature and pressure (STP) was observed from combined discharge of the aqueous reactors, equivalent to about 60 L/min $H_2$ or about ⅓ kg $H_2$ per hour. A little more than three kilograms of water were consumed per hour by the apparatus, as would be expected given the likely presence of some water vapor or condensed water in the discharge.

An alternative setup using a single gas barrier separating the anode plates and cathode plates as shown in FIG. 6B was tested, with other conditions as described in the foregoing paragraph. However, the DC input voltage was adjusted to within the range of 6 to 8 Volts. Under these conditions, a flow rate of about 40 L/min of gas was obtained from the cathode side of the barrier, and a flow of about 20 L/min of gas from the anode side. The gas obtained from the cathode side was observed to be combustible in air, but not explosive. The gas obtained from the anode side was not combustible. These observations are consistent with production of separated hydrogen and oxygen gases from opposite sides of the barrier.

Use of a catalyst such as platinum, palladium or nickel may be used to reduce the temperature for creating the plasma, there by reducing the temp of the reformation of hydrocarbon into fuel.

Thus, an aqueous reactor and various uses of the reactor have been disclosed. While embodiments and applications of this technology have been shown and described, it would be apparent to those skilled in the art that many more modifications are possible without departing from the inventive concepts herein. The invention therefore is not to be restricted except in the spirit of the appended claims.

The invention claimed is:

1. A process for preparing a combustible fluid, comprising:
   providing a liquid fuel stock including a suspension of carbon based material in water with an electrolyte having:
      one or more cathode plates and one or more anode plates at opposite ends of one or more arrays of electrically conductive parallel spaced-apart plates that further include
         neutral plates interposed between and electrically isolated from the cathode plates and the anode plates,
         the neutral plates arranged in interleaved neutral plate subsets each comprising at least three electrically connected plates and each being electrically isolated from other neutral plate subsets;
   applying an electric current by a provided 3-phase full wave rectifier that is coupled with a 3-phase alternator to supply a DC drive input across the cathode and anode plates to generate a combustible gaseous output from the liquid fuel stock; and
   extracting the combustible gaseous output from the reaction vessel.

2. The process of claim 1, wherein the carbon based material has an electrical charge prior to being suspended within the water.

3. The process of claim 1, wherein the carbon based material includes coal having a median particle diameter of not larger than approximately 10 microns.

4. The process of claim 1, wherein the liquid fuel stock is maintained at a temperature of approximately 180.degree. F. or above during the application of said current and under sufficient pressure to maintain the liquid fuel stock below a boiling point of the water while generating the combustible gaseous output.

5. The process of claim 1, wherein the liquid fuel stock further includes liquid hydrocarbon fuel.

6. The process of claim 5, wherein the volumetric ratio of hydrocarbon liquid to carbon base material is from about 0.75 to one to about one to one.

* * * * *